United States Patent
Lutzer et al.

(10) Patent No.: US 7,850,209 B2
(45) Date of Patent: Dec. 14, 2010

(54) TUBE ASSEMBLY AND TUBE ASSEMBLY SYSTEM HAVING SUCH TUBE ASSEMBLIES

(75) Inventors: Wilhelm Lutzer, Zarpen (DE); Marc Scheel, Hamburg (DE); Christian Wildhagen, Flensburg (DE); Thorsten Otto, Hamburg (DE)

(73) Assignee: Airbus Deutschland GmbH (DE)

( * ) Notice: Subject to any disclaimer, the term of this patent is extended or adjusted under 35 U.S.C. 154(b) by 0 days.

(21) Appl. No.: 11/769,426

(22) Filed: Jun. 27, 2007

(65) Prior Publication Data

US 2008/0012295 A1    Jan. 17, 2008

Related U.S. Application Data

(60) Provisional application No. 60/817,240, filed on Jun. 28, 2006.

(30) Foreign Application Priority Data

Jun. 28, 2006    (DE) .................... 10 2006 029 705

(51) Int. Cl.
*F16L 27/00*    (2006.01)
(52) U.S. Cl. ...................... 285/281; 285/263
(58) Field of Classification Search ............. 285/365, 285/281, 261, 270, 263, 145.3, 146.1, 146.2, 285/146.3, 223, 234, 121.7, 145.2, 147.1, 285/184, 349
See application file for complete search history.

(56) References Cited

U.S. PATENT DOCUMENTS

| | | | |
|---|---|---|---|
| 56,284 A * | 7/1866 | Smith et al. ................ 239/258 |
| RE3,704 E * | 11/1869 | Morrison ................... 285/330 |
| 1,125,642 A * | 1/1915 | Blanchard .................. 285/89 |
| 2,067,768 A * | 1/1937 | Krefft ...................... 285/263 |
| 2,203,088 A * | 6/1940 | Hansson ..................... 285/7 |
| 2,329,369 A * | 9/1943 | Haver ..................... 285/145.3 |
| 2,417,491 A * | 3/1947 | Hill ...................... 285/121.7 |
| 2,489,100 A * | 11/1949 | Marco ..................... 285/184 |
| 2,556,659 A * | 6/1951 | Patterson ................ 285/145.3 |
| 2,581,047 A * | 1/1952 | Salmond et al. ............ 285/181 |
| 2,693,371 A * | 11/1954 | Nelson ..................... 285/41 |
| 3,246,793 A * | 4/1966 | Wade ...................... 220/321 |
| 3,544,137 A * | 12/1970 | Contreras et al. ........... 285/261 |
| 3,583,730 A * | 6/1971 | Kozlowski ................. 285/47 |
| 3,762,746 A * | 10/1973 | Amada ..................... 285/184 |
| 3,762,787 A | 10/1973 | Grubb |
| 3,825,041 A * | 7/1974 | Cornog ..................... 141/1 |
| 4,298,219 A | 11/1981 | Amelink |
| 4,448,449 A * | 5/1984 | Halling et al. ............. 285/263 |

(Continued)

FOREIGN PATENT DOCUMENTS

DE    1039798    7/1957

(Continued)

*Primary Examiner*—Aaron Dunwoody
(74) *Attorney, Agent, or Firm*—Ostrolenk Faber LLP

(57) ABSTRACT

The invention relates to a tube assembly for connecting a first tube to a second tube, wherein a connection end of the first tube and a connection end of the second tube form a swivel joint, a rotational axis of the swivel joint and a tube axis of the first and the second tube form an angle $\alpha$, and the first tube is rotatable relative to the second tube in the region of between $0°$ and $2\alpha$.

17 Claims, 6 Drawing Sheets

U.S. PATENT DOCUMENTS

| | | | | |
|---|---|---|---|---|
| 4,598,427 | A * | 7/1986 | Vykukal | 2/2.12 |
| 4,627,646 | A * | 12/1986 | Kessel | 285/114 |
| 4,776,617 | A | 10/1988 | Sato | |
| 4,779,901 | A * | 10/1988 | Halling | 285/184 |
| 4,906,027 | A * | 3/1990 | De Gruijter | 285/51 |
| 4,969,923 | A * | 11/1990 | Reeder et al. | 285/365 |
| 5,048,873 | A * | 9/1991 | Allread et al. | 285/261 |
| 5,121,852 | A * | 6/1992 | Wilkes | 220/203.12 |
| 5,188,400 | A * | 2/1993 | Riley et al. | 285/233 |
| 5,374,086 | A * | 12/1994 | Higgins | 285/111 |
| 5,597,184 | A * | 1/1997 | Brenes et al. | 285/24 |
| 5,897,146 | A | 4/1999 | Saito et al. | |
| 5,904,382 | A * | 5/1999 | Bronnert | 285/349 |
| 5,921,694 | A * | 7/1999 | Herbermann | 403/56 |
| 6,234,545 | B1 * | 5/2001 | Babuder et al. | 285/364 |
| 6,299,217 | B1 | 10/2001 | Saito et al. | |
| 6,439,619 | B1 * | 8/2002 | Storage et al. | 285/330 |
| 6,561,549 | B1 * | 5/2003 | Moris et al. | 285/184 |
| 6,709,028 | B2 * | 3/2004 | Dallai et al. | 285/420 |
| 6,971,682 | B2 * | 12/2005 | Hoang et al. | 285/93 |
| 7,320,486 | B2 * | 1/2008 | Geppert et al. | 285/420 |
| 2004/0130149 | A1 * | 7/2004 | Gilmore | 285/261 |
| 2004/0245777 | A1 * | 12/2004 | Vila | 285/261 |
| 2006/0082142 | A1 * | 4/2006 | Berchtold et al. | 285/261 |
| 2006/0175833 | A1 * | 8/2006 | Tenglund | 285/365 |

FOREIGN PATENT DOCUMENTS

| | | |
|---|---|---|
| DE | 1039798 | 9/1958 |
| DE | 2301869 | 7/1973 |
| DE | 8436457 | 3/1985 |
| EP | 87741 A1 * | 9/1983 |
| JP | 53075520 A * | 7/1978 |
| WO | WO 8700601 A1 * | 1/1987 |
| WO | WO 00/16000 | 3/2000 |

* cited by examiner

TUBE ASSEMBLY AND TUBE ASSEMBLY SYSTEM HAVING SUCH TUBE ASSEMBLIES

REFERENCE TO RELATED APPLICATIONS

This application claims the benefit of the filing date of U.S. Provisional Patent Application No. 60/817,240 filed Jun. 28, 2006 and of German Patent Application No. 10 2006 029 705.9 filed Jun. 28, 2006.

SUMMARY OF THE INVENTION

The invention relates to a tube assembly and to a tube assembly system that uses such tube assemblies.

DESCRIPTION OF PREFERRED EMBODIMENTS OF THE INVENTION

Figure 1:
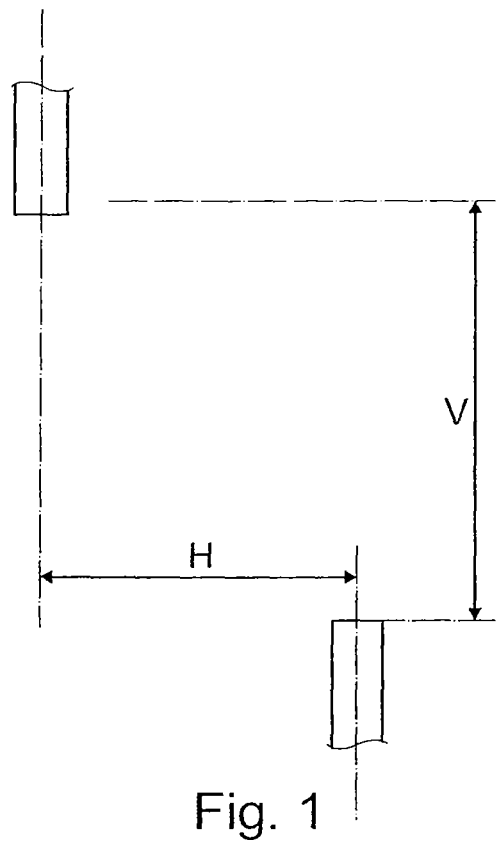
FIG. 1 is a diagrammable illustration of the problem to which the invention is durable.

The technical problem on which the invention is based is shown in FIG. 1; it consists of connecting, by way of a tube assembly, two tube connections that have a constant vertical spacing V and a variable horizontal spacing H from each other, and whose axes are parallel. At a constant vertical spacing V this connection element is to be adjustable for any desired horizontal spacings H of between zero and a maximum value.

Figure 2:
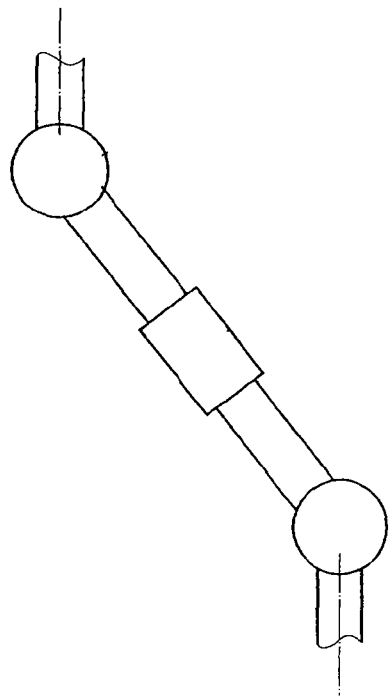
FIG. 2 is a view of a first prior art embodiment.

A known solution is provided by the combination, shown in FIG. 2, of two spherical joints at the tube connections, which make it possible to change the angle, and by a telescopic element between the spherical joints, which telescopic element ensures a change in length brought about by the change in angle. U.S. Pat. No. 4,776,617 discloses such a telescopic element. DE 1039798 discloses such a spherical joint.

The spherical joint according to prior art comprises an outer spherical shell composed of two parts, and a spherical head that is movably held in said spherical shell. The two parts of the outer spherical shell can be designed as screwed-sleeve joints or as screwed ring-shaped flanges. The seal between the spherical shell and the spherical head is achieved by means of a sealing ring held in a groove of the spherical shell or of the spherical head.

Figure 3:
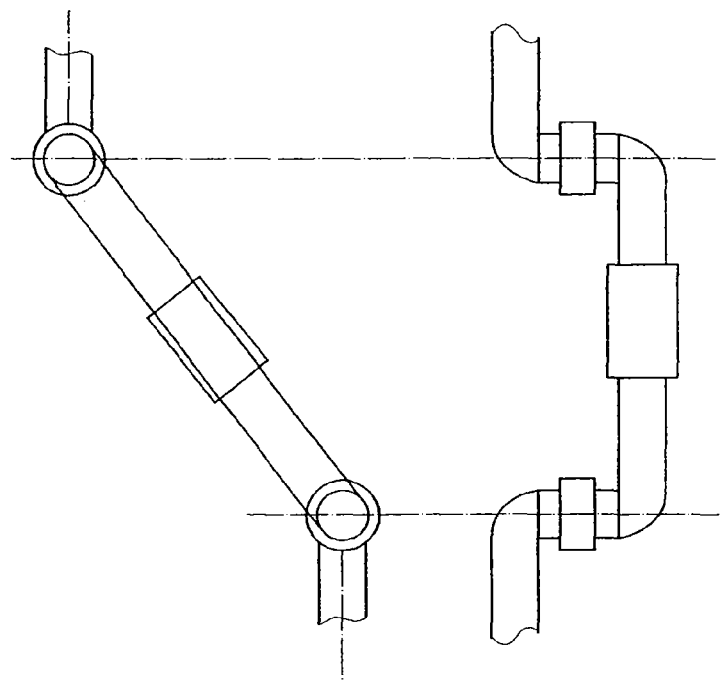
FIG. 3 is an illustration of a second embodiment.

FIG. 3 shows a known use of swivel joints instead of the spherical joints. In this case the two tube connections and the two ends of the middle tubular piece, which comprises a telescopic element, are to be provided with 90° bends. The 90° bends can be connected to each other by way of known swivel joints.

Both of the above-mentioned known attempts to solve the above-mentioned problem are associated with a disadvantage in that the required installation space perpendicular in relation to the plane defined by the two axes of the tube connections to be connected is significantly larger than the diameter of the tubes.

In the case of the first-mentioned solution for the largest outside diameter of the spherical joint at larger angular changes to be adjusted, depending on the design, more than twice the tube diameter results. In the last-mentioned solution the axis of the middle tubular piece, which comprises a telescopic element, is laterally offset as a result of the 90° bends.

It may be a need to create a tube assembly, a tube assembly element and a tube assembly system with such tube assemblies and tube assembly elements, wherein the disadvantages of a large installation space, as is the case in prior art, are avoided.

A tube assembly according to the invention is used to connect a first tube to a second tube, wherein a connection end of the first tube and a connection end of the second tube form a swivel joint. A rotational axis of the swivel joint and tube axes of the first and the second tube form an angle $\alpha$, wherein the first tube is rotatable relative to the second tube from a first angle to a second angle.

According to an improvement of the invention, the connection end of the first tube is designed as a sleeve which comprises an annular groove for accommodating a sealing ring.

The connection end of the second tube is designed as a cylindrical sleeve whose inside diameter is adapted to the outside diameter of the annular groove of the sleeve.

According to an improvement of the invention, axial securing of the tube assembly takes place by means of a retaining ring which keeps the sleeve of the first tube and the cylindrical sleeve of the second tube in contact with each other.

According to an improvement of the invention, the retaining ring is designed so as to be C-shaped in cross section. The retaining ring is, for example, in two parts, and the halves are connected to each other by means of screws and nuts.

According to another improvement of the invention, the retaining ring is designed so as to be H-shaped and in two parts, wherein the halves are connected to each other by way of hose clamps.

According to an improvement of the invention, the angle $\beta$ between the tube axes of the first tube and of the second tube can be set from an angle of 0° to an angle $2\alpha$ in that the tubes are rotated by 180° relative to each other.

According to another improvement of the invention, the connection ends of the first tube and of the second tube are expanded in a spherical shape in the region of the rotational plane.

According to another aspect of the invention, a tube assembly element is used for connecting a first tube to a second tube, wherein a tube end of the first tube is expanded so that a tube end of the second tube can be inserted into this expansion, wherein the outside diameter of the tube end of the second tube matches the inside diameter of the tube end of the first tube, and the two tubes can be telescopically slid relative to each other.

According to an improvement of the tube assembly element, the tube ends are sealed towards the outside by way of a sealing element.

According to another improvement of the tube assembly element, the sealing element is a piece of hose.

According to yet another improvement of the invention a sealing body is arranged between the first tube and the second tube.

In order to solve the problem described above with reference to FIG. 1, according to the invention a tube assembly system is provided which comprises at least two above-mentioned tube assemblies and at least one tube assembly element by way of which the tube assemblies are connected to each other.

Figure 4:
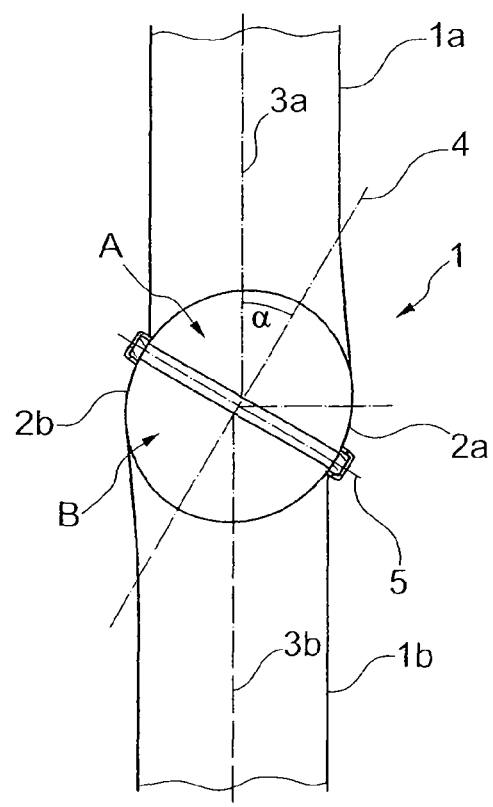
FIG. 4 a diagrammatic partial view of a tube assembly according to a preferred exemplary embodiment of the invention.

Below, with reference to the enclosed FIGS. 4 to 8, preferred exemplary embodiments of the invention are described. In the Figures, the same reference characters are used for identical or corresponding components. The following are shown:

FIG. 4 shows a tube assembly 1 according to the preferred exemplary embodiment of the invention. The tube assembly 1 is used to connect a first tube 1a to a second tube 1b. A connection end A of the first tube 1a and a connection end B of the second tube 1b form a swivel joint in a space-saving design.

As shown in FIG. 4, the first tube 1a comprises a tube axis 3a, and the second tube 1b comprises a tube axis 3b. The first tube 1a and the second tube 1b are interconnected such that the tube axes 3a, 3b and a rotational axis 4 of the swivel joint form an angle α.

The first tube 1a is rotatable within a rotational plane 5 relative to the second tube 1b. A section of the rotational plane 5 with a cylindrical tube at an angle α results in an ellipse. So that the two tubes 1a and 1b that are to be connected can be rotated in relation to each other, they have to be expanded in a spherical shape in the region of the rotational plane 5 so that the section of this plane with the expanded tube ends 2a and 2b of the first and of the second tube 1a and 1b becomes circular.

Figure 5:
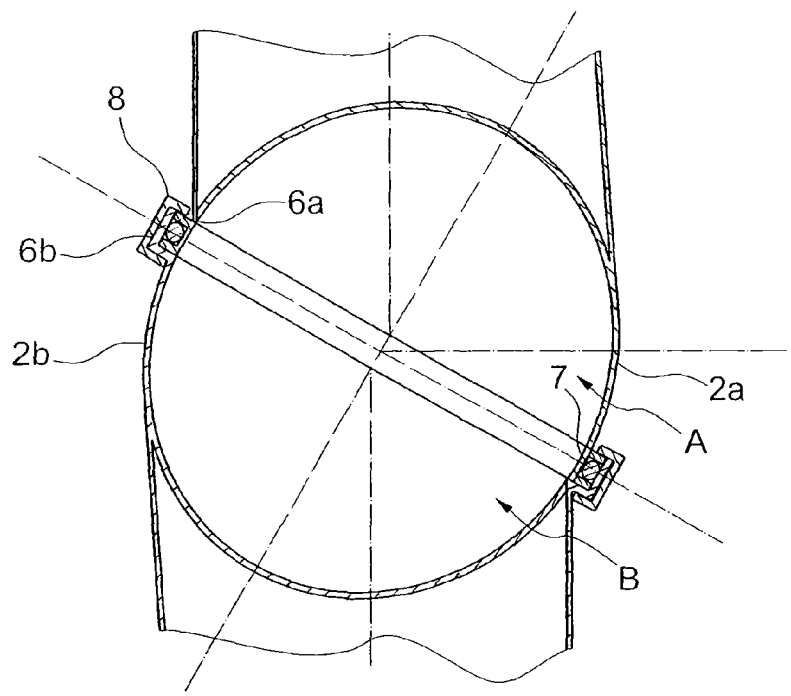
FIG. 5 a detailed view of the tube assembly according to FIG. 4.

FIG. 5 shows a detailed view of the formed swivel joint according to FIG. 4.

Figure 9:
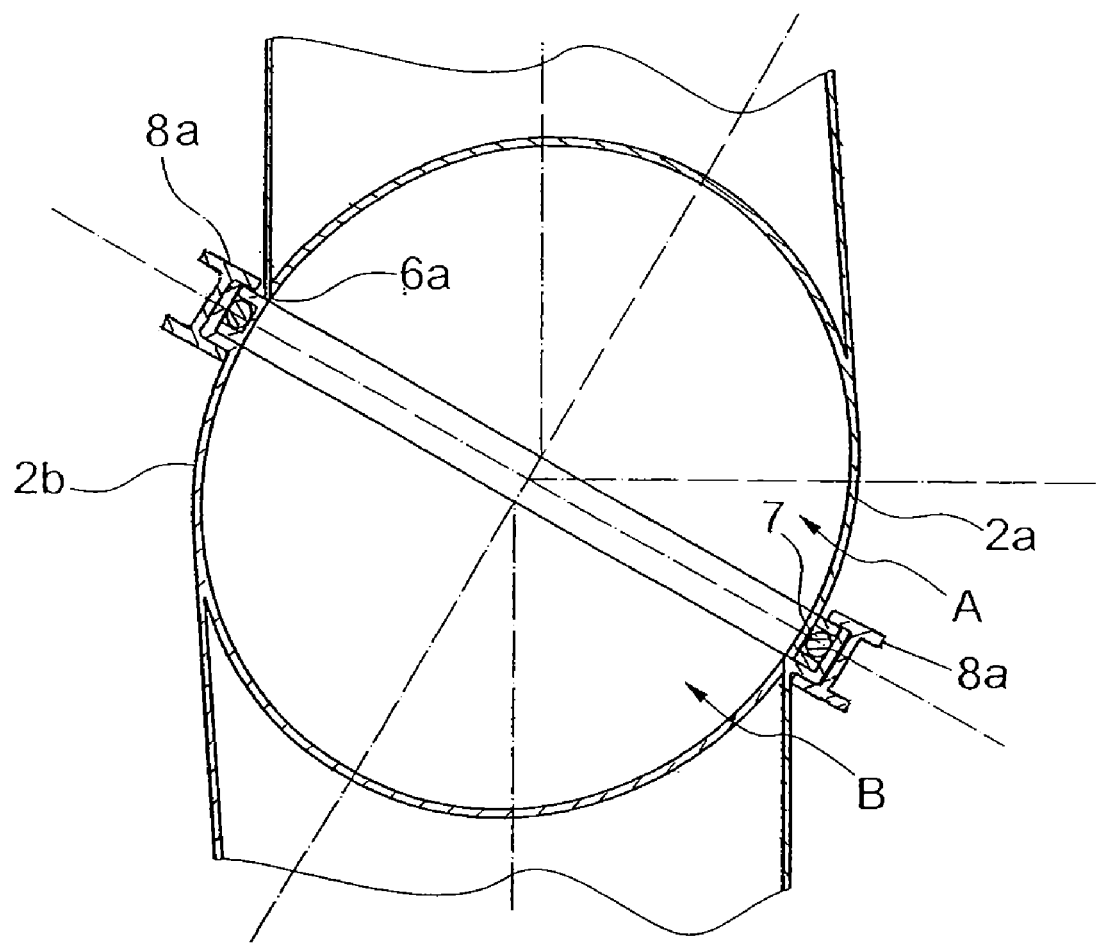
FIG. 9 illustrates a detailed schematic view of the tube assembly shown in FIG. 5 with an H-shaped retaining ring.
Figure 10:
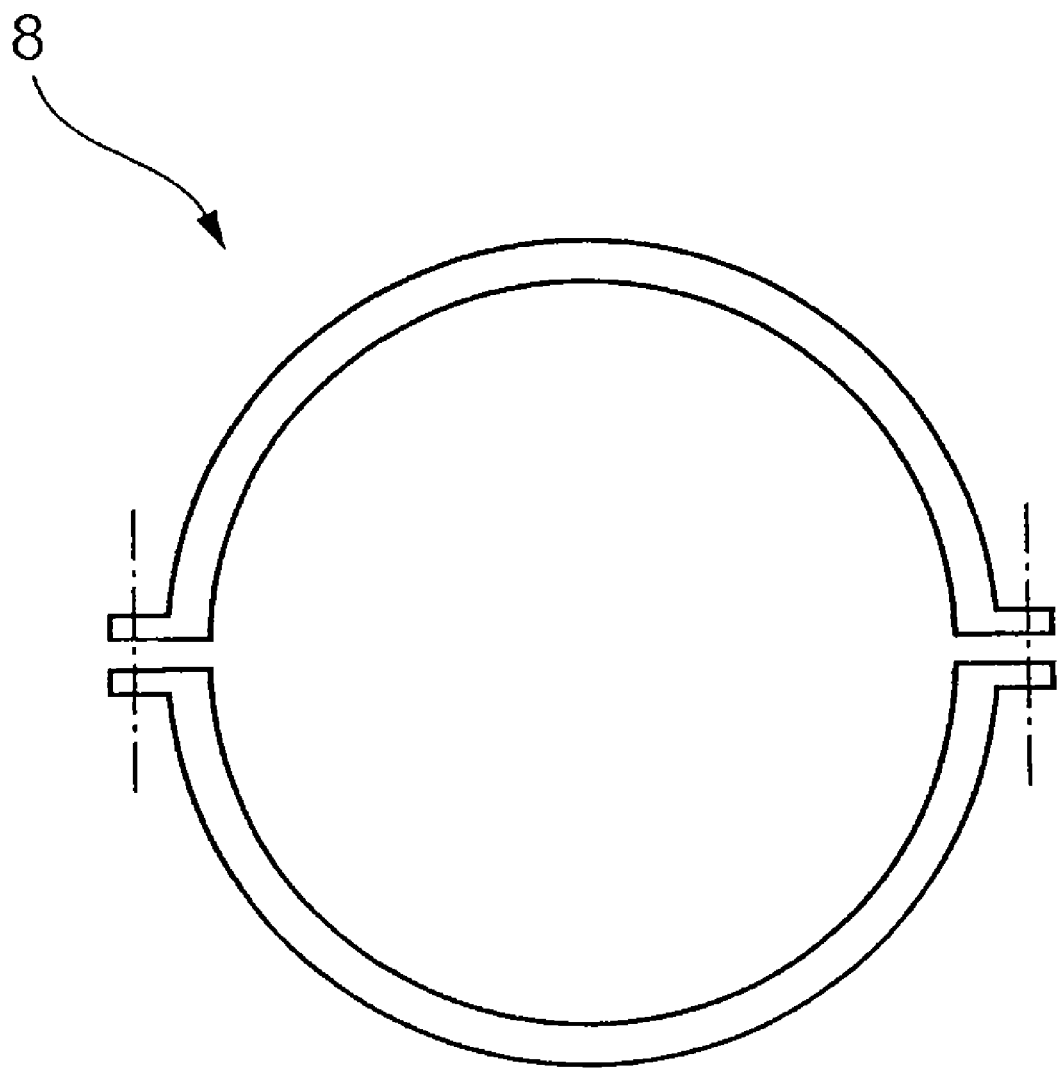
FIG. 10 illustrates a retaining ring provided in two parts, which may be connected, for example, by way of clamps, such as hose clamps.

As shown in FIG. 5, the connection end A of the first tube 1a comprises a sleeve 6a that comprises an annular groove to accommodate a sealing ring 7. The connection end B of the second tube 1b is designed as a cylindrical sleeve 6b whose inside diameter is adapted to the outside diameter of the annular groove of the sleeve 6a, with said cylindrical sleeve 6b being slid over said annular groove and the sealing ring 7. For example, according to the preferred exemplary embodiment, axial securing can take place by means of a retaining ring 8 with a C-shaped cross section, which retaining ring 8 is in two parts, and with the two halves of said retaining ring 8 being connected to each other by means of screws and nuts (not shown). Another option consists of designing the cross section of the two-part retaining ring so that it is H-shaped, and to connect the two halves by means of a hose clamp, as illustrated in FIG. 9.

Figure 6A:
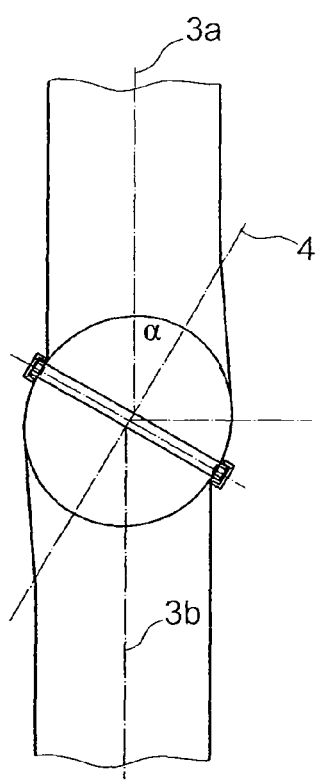
FIGS. 6A and B the tube assembly according to FIG. 4 in a first position and in a second position.
Figure 6B:
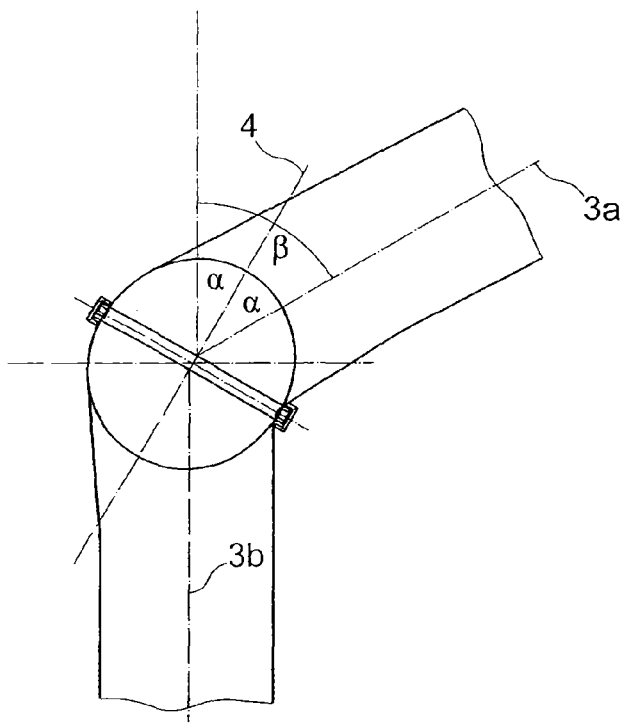

FIGS. 6A and 6B show tube assembly according to FIG. 4 in a first state (FIG. 6A) and in a second state (FIG. 6B).

Starting from the original position in FIG. 6A, an angle β, as shown in FIG. 6B, between the tube axes 3a and 3b of the first tube 1a and of the second tube 1b can be adjusted between 0° and a maximum of 2α in that the two tubes are rotated in relation to each other by a maximum of 180°. The configuration for the largest angle 2α that can be set is shown in FIG. 6B.

Figure 7:
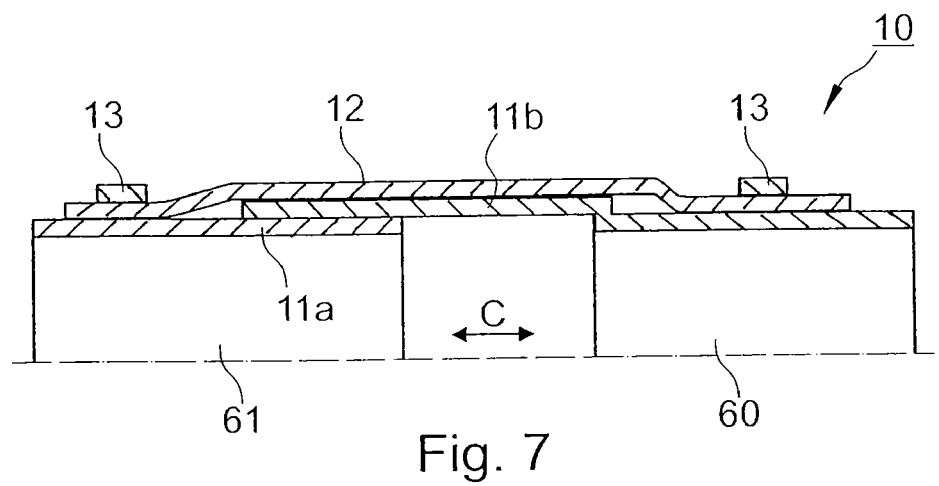
FIG. 7 a partial cross section view of a tube assembly element according to a preferred exemplary embodiment.

FIG. 7 shows a tube assembly element 10 according to a preferred exemplary embodiment of the invention.

The tube assembly element 10 is designed as a telescopic element that connects a first tube end 11a of a first tube 61 to a second tube end 11b of a second tube 60. As shown in FIG. 7, the tube end 11b is expanded along a determined length so that the tube end 11a can be inserted into it. The outside diameter of the inner tube end 11a and the inside diameter of the outer tube end 11b are adapted to each other such that the two tube ends are slidable in relation to each other, as indicated by the arrow C. According to the preferred exemplary embodiment of the tube assembly element 10, sealing takes place by way of a hose piece 12 that is pushed over the tube assembly element 10 and on both ends is connected to the tube ends 11a, 11b by means of hose clamps 13. Another option consists of using a sealing body between the inner and the outer tube 11a, 11b.

Figure 8:
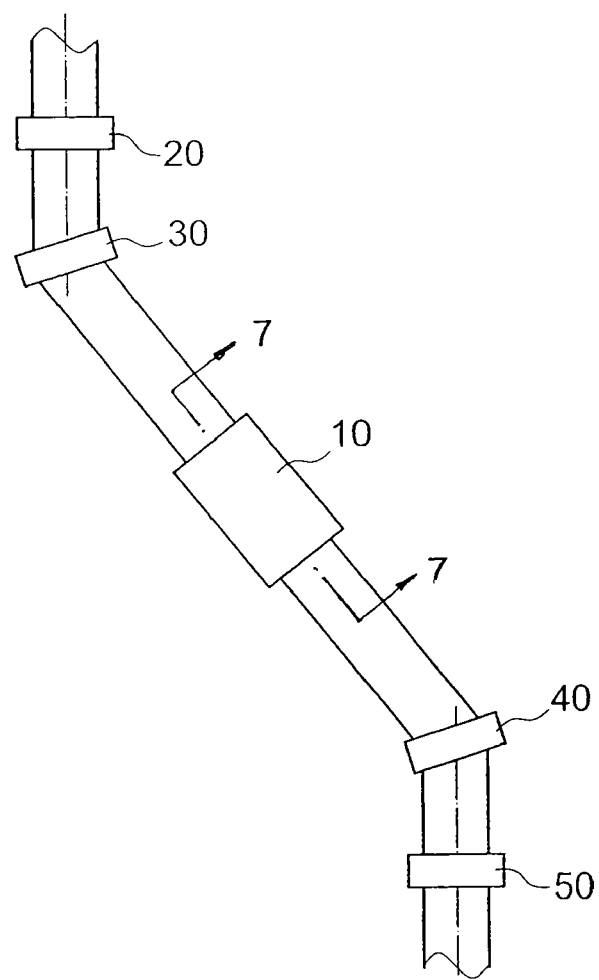
FIG. 8 a tube assembly system according to a preferred exemplary embodiment of the invention.

FIG. 8 shows a tube assembly system that uses the above-described tube assembly and the tube assembly element to connect tubes to each other.

As is the case in FIG. 8, the tube assembly system comprises four tube assemblies 20, 30, 40, 50, and a tube assembly element 10. The tube assemblies 30 and 40 comprise a structural design as described with reference to FIGS. 4 to 6. The tube assemblies 20 and 50 can in principle be designed in the same manner, except that in the present case the angle α between the rotary axis and the tube axis is zero.

The design of the telescopic tube assembly element 10 is the same as that described with reference to FIG. 7. Adapting the configuration to another horizontal spacing H of the tube connections to be connected can take place in that on the swivel joints 30, 40 (tube assemblies) the tube pieces are rotated against each other far enough for the correct angle to be set. In order to simplify adjustment of the angle, a scale can be provided on the swivel joints. In order to adjust the length of the telescopic tube assembly element 10 it is merely necessary to undo the hose clamps 13, as shown in FIG. 7.

Although, above, the invention has been described with reference to preferred exemplary embodiments, it is understood that modifications and changes can be made without leaving the scope of protection of the patent. For example, a greater number of tube pieces than shown in FIG. 8 can be connected to each other in the way described.

What is claimed is:

1. A tube assembly for connecting a first tube having a first connection end to a second tube having a second connection end, the tube assembly comprising:

the first tube having a first tube axis and the second tube having a second tube axis;

a swivel joint formed by the first connection end of the first tube and the second connection end of the second tube, the first connection end rotated within a rotational plane with respect to the second connection end, and the first connection end and the second connection end expanded in a first spherical shape and a second spherical shape, respectively, such that the first spherical shape lies within the second spherical shape, wherein the swivel joint has a rotational axis about which the first tube axis is rotatable, the rotational axis being perpendicular to the rotational plane, wherein the swivel joint is adjustable such that the rotational axis and the first tube axis, and the rotational axis and the second tube axis each form an angle α greater than 0°, and the swivel joint is adjustable such that the first tube is rotatable relative to the second tube from a minimal first angle β to a maximum second angle β, wherein the first connection end of the first tube comprises a sleeve which comprises a first outwardly extending closed ring-shaped annular surface and a second outwardly extending closed ring-shaped surface extending annularly and parallel to the first ring-shaped surface, the first ring-shaped surface and the second ring-shaped surface defining an annular groove between the first ring-shaped surface and the second ring-shaped surface, wherein the second connection end of the second tube comprises a cylindrical sleeve whose inside diameter is set to be an outside diamater of the annular groove to rotatably secure the first tube with the second tube, and further comprising a retaining ring in two connectable halves positioned parallel to the rotational plane and configured to axially secure the tube assembly by enclosing at least partially the sleeve of the first tube and the cylindrical sleeve of the second tube so as to prevent the sleeve of the second tube from being pulled out of the sleeve of the first tube.

2. The tube assembly of claim 1, further comprising a sealing ring positioned in the annular groove of the sleeve.

3. The tube assembly of claim 2, wherein the annular groove and the sealing ring have principal extents lying along the rotational plane.

4. The tube assembly of claim 1, wherein the retaining ring has a C-shaped cross-section.

5. The tube assembly of claim 4, wherein the retaining ring is in two parts, with each of the two parts being connected to each other by means of screws and nuts.

6. The tube assembly of claim 1, wherein the retaining ring is H-shaped and in two parts, with each of the two parts being connected to each other by way of hose clamps.

7. The tube assembly of claim 1, wherein the first angle $\beta$ is 0° and the second angle $\beta$ is a maximum of 180°, and the swivel joint is rotatable to any angle between the first angle $\beta$ and the second angle $\beta$, the second angle $\beta$ being equal to $2\alpha$.

8. In combination, the tube assembly of claim 1 and a telescoping tube assembly element for connecting the first tube to a third tube, the tube assembly element comprising:

the first tube having a first tube end and the third tube having a third tube end, wherein the first tube end is expanded so that the third tube end is received into this expansion, and wherein an outside diameter of the third tube end is set to be an inside diameter of the first tube end, and the first tube and the third tube are configured to be telescopically slid relative to each other.

9. The tube assembly element of claim 8, further comprising a sealing element positioned and configured to seal to an outside of the first tube end and the third tube end.

10. The tube assembly element of claim 9, wherein the sealing element is a hose piece.

11. The tube assembly element of claim 8, further comprising a sealing body positioned between the first tube and the third tube.

12. The tube assembly of claim 1, wherein a portion of the rotational plane lying within the first spherical shape and the second spherical shape is circular.

13. The tube assembly of claim 1, and further comprising a sealing ring positioned inside the annular groove.

14. A tube assembly for connecting a first tube having a first connection end to a second tube having a second connection end, and in combination with the tube assembly a telescoping assembly for connecting the first tube to a third tube, the tube assembly comprising:

the first tube having a first tube axis and the second tube having a second tube axis;

a swivel joint formed by the first connection end of the first tube and the second connection end of the second tube, the first connection end rotated within a rotational plane with respect to the second connection end, and the first connection end and the second connection end expanded in a first spherical shape and a second spherical shape, respectively, such that the first spherical shape lies within the second spherical shape, wherein the swivel joint has a rotational axis about which the first tube axis is rotatable, the rotational axis being perpendicular to the rotational plane, wherein the swivel joint is adjustable such that a rotational axis of the rotational axis and the first tube axis, and the rotational axis and the second tube axis each form an angle $\alpha$ greater than 0°, and the swivel joint is adjustable such that the first tube is rotatable relative to the second tube from a minimal first angle $\beta$ to a maximum second angle $\beta$, wherein the first connection end of the first tube comprises a sleeve which comprises an annular groove, wherein the second connection end of the second tube comprises a cylindrical sleeve whose inside diameter is set to be an outside diamater of the annular groove to rotatably secure the first tube with the second tube, and further comprising a retaining ring positioned and configured to rotatably secure axially the tube assembly by affixing the sleeve of the first tube with the cylindrical sleeve of the second tube, wherein the first tube has a first tube end and the third tube has a third tube end, the first tube end being expanded so that the third tube end is received into the expansion, and wherein an outside diameter of the third tube end is an inside diameter of the first tube end, and the first tube and the third tube are configured to be telescopically slid relative to each other.

15. The tube assembly element of claim 14, further comprising a sealing element positioned and configured to seal to an outside of the first tube end and the third tube end.

16. The tube assembly element of claim 15, wherein the sealing element is a hose piece.

17. The tube assembly element of claim 14, further comprising a sealing body positioned between the first tube and the third tube.

* * * * *